_United States Patent Office_ 2,753,537
Patented July 3, 1956

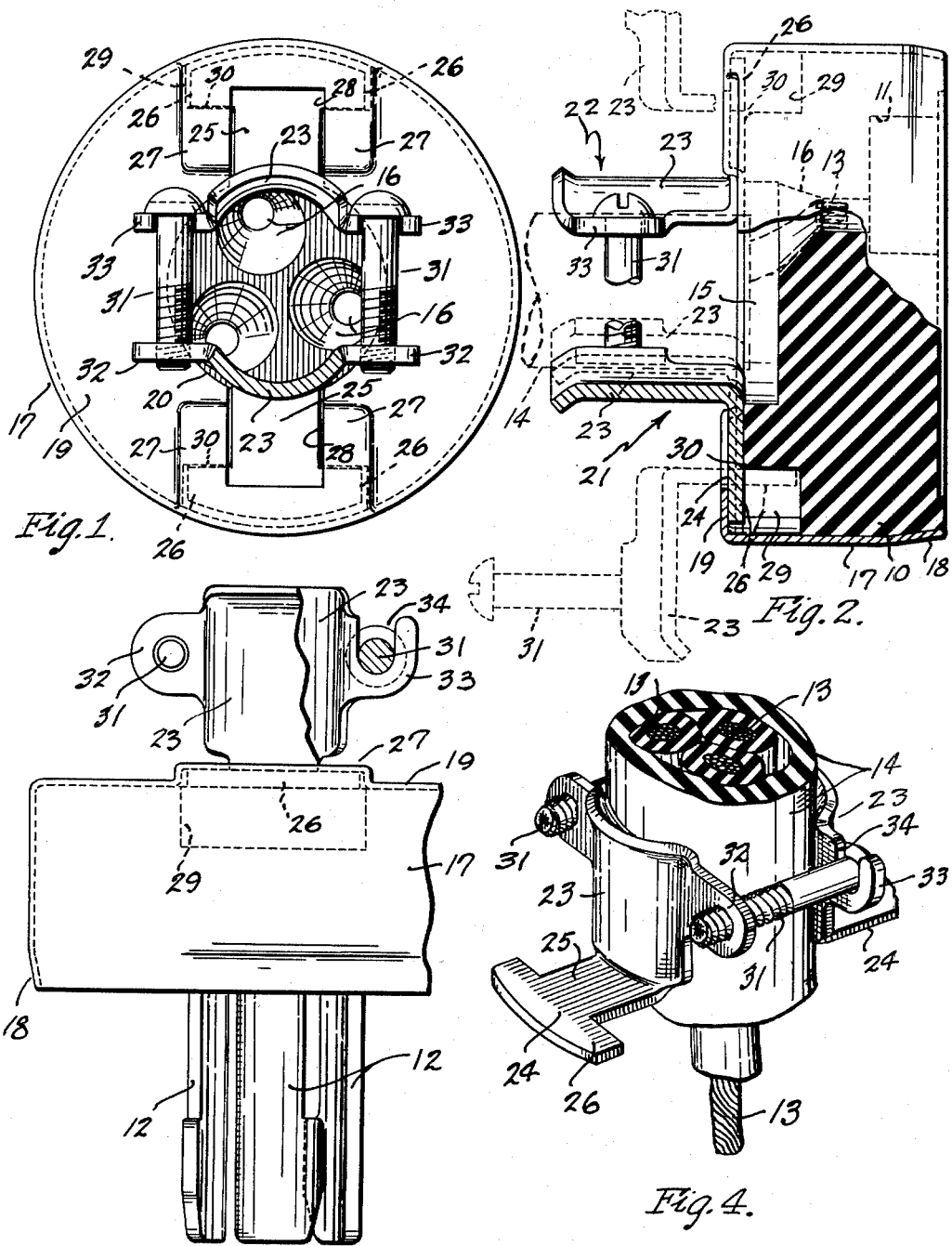

2,753,537

RETRACTABLE CORD CLAMP FOR WIRING DEVICES

Harvey Hubbell, Long Hill, Conn.

Application September 7, 1951, Serial No. 245,607

4 Claims. (Cl. 339—103)

This invention relates to electrical wiring devices, and particularly to a cord clamp for such devices for relieving the strain of the conducting cord upon the connections to contacts of electrical connectors such, for example, as attachment plug caps and the like.

It is an object of the device to provide an improved means for securing the clamps to the body of the wiring device whereby the clamps may be moved a greater distance away from the cord to facilitate the connection of the cord conductors to the device.

A more specific object is to provide means for securing the clamps to the wiring device which will permit both lateral sliding movement and swinging pivotal movements of the clamping portions of the clamps away from the cord or cable to provide greater clearance and space for insertion of the cord or cable.

A further object of the device is to provide a connecting means for mounting these cord clamps, in which they are guided for straight radial or lateral movement toward or from the cord or cable for the clamping and releasing operations, and after being released they may be slidably shifted away from the conductor cord or cable and may then be swung about a pivot to position the clamping portions at a greater distance from the cord or cable and to lie substantially in a plane parallel to the plane of the end of the body of the wiring device.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a top plan or end view on an enlarged scale of a wiring device showing my improved cord clamp attached thereto;

Fig. 2 is a partial side elevation and partial section looking from the left of Fig. 1;

Fig. 3 is a partial side elevation with parts broken away looking toward the bottom of Fig. 1, and Fig. 4 is a perspective view and partial section showing the clamping elements applied to a conductor cord or cable and removed from the body of the wiring device.

Although this cord clamp is adapted for use in various electrical wiring devices it is shown in the drawing by way of example as applied to an attachment plug cap for plugging into any suitable outlet receptacle or similar connector for connecting an electrical device or attachment to a house wiring or similar system. The attachment plug cap comprises a body member 10 of suitable insulating material provided in the rear or inner end wall with recesses 11 in which are mounted (by means not shown) the bases of contact blades 12 projecting from the body for insertion in the entrance slots of an outlet receptacle or similar connector, and suitable binding posts or other clamping and connecting means (also not shown) are provided for connecting the lead wires, indicated at 13, of an insulated conductor cord or cable 14. In this construction the other or outer end wall of the body is provided with a recess 15 with tapered openings 16 leading one to each of the conductor wire clamping or securing means, after the ends of the wires are stripped of insulation, as indicated in the lower part of Fig. 4. A portion of this insulated conductor cord or cable is shown in full lines in Fig. 4 clamped between the cord grip or clamping means, and is shown in dotted lines in Fig. 2, with the elements of the clamps spaced a short distance laterally away from this cord or cable.

The insulating body 10 of the wiring device is enclosed in a protective metal shell or casing 17 which encloses the side wall and is permanently secured to the body by tapering or bending in a portion of its inner edge, as indicated at 18, on a similarly tapered part of the body. This shell or casing includes an outer end wall 19 overlying the outer end or surface of the body 10, and is provided with a central opening 20 in alignment with the openings 16 and the chamber 15 for the conductor leads.

The cord or cable clamp comprises two elements 21 and 22 each comprising a curved clamping portion 23 to receive and engage the opposite sides of the cord or cable 14, and a foot portion 24 leading outwardly from the inner end of the clamping portion at substantially right angles thereto. These foot portions are preferably substantially flat and T-shaped as shown in Fig. 4, comprising a central connecting bar 25 and a substantially flat cross bar 26 at the outer end of the central bar. These foot portions are mounted on and secured to the wiring device by being mounted between the end wall 19 of the shell or casing 17 and the outer end or surface of the insulating body 10. For this purpose the end of the insulating body may be provided with radial grooves or recesses to receive these foot portions, but preferably the end wall 19 of the casing is pressed outwardly or raised, as indicated at 27, over the transverse bar 26 of the foot portion, and provides connecting and guiding means to not only secure the clamping elements to the wiring device but also to permit lateral or radial sliding movement of these foot portions to permit the clamping portions 23 to be moved toward or from the cable 14. To permit this movement the end wall 19 is provided with a radial slot 28 in this raised portion and the unraised portion leading from the central opening 20, as shown in Fig. 1, in which the connecting portion between the clamping portion 23 and the foot portion may slide.

To provide a greater clearance for the cord 14 in making the electrical connection, the clamping elements 21 and 22 are also mounted for swinging movement about a pivot so that the clamping portions 23 may be shifted even farther away from the cord than is possible as a result of the sliding movement only. For this purpose the insulating body 10 is provided under the outer end portions of the guiding means for the foot portions 24 with a recess 29 which is so located as to be under the cross bar 26 when the clamping element is shifted to its outer position, as indicated in Figs. 1 and 2 in full lines, and this recess is of a size and depth so that when in this position each clamping element may be swung about the inner edge 30 of the recess as a pivot to swing the cross bar 26 inwardly into the recess, as shown in dotted lines Fig. 2. This will permit the clamping portion 23 to swing outwardly to a position substantially parallel with the end wall 19 of the electrical device, as also shown in dotted lines Fig. 2. It will be seen that when in this position the clamping portions 23 of the elements of the clamp are well away from the cord 14 and will not any way interfere with the insertion of the conductor leads from this cord and their connection to the binding posts or other securing means for the electrical contacts in the wiring device. After the cord is in place, as indicated in dotted lines in Fig. 2, the clamping elements may be swung back to the full line position of this figure and then slid inwardly toward the cord or cable, bringing the concave clamping portions 23 against the opposite sides of the cord. They are guided in this sliding movement by the foot portions 24 in the guideway formed between the end wall 19 of the shell or casing and the end surface of the insulated body 10 immediately under this end wall of the casing. In the outwardly swinging movement the central bar 25 passes out through the slot 28.

After these portions 23 are brought against the sides of the cable they may be clamped tightly against the cable by any suitable means, in the arrangement shown by the screws 31. For the purpose of securing these screws to the clamps they are each provided with lateral lugs or ears 32 or 33. The screws are threaded into the ears of one of the elements, as the ears 32, and pass through openings in the ears of the other element, as at 33, with the heads on the opposite side of these ears. The screws could, of course, be unscrewed and separated from the ears 32 to permit the clamps to be swung outwardly, but to obviate the necessity of entirely disconnecting the screws, with possibility of loss, the openings in the ears 33 are provided in the form of an open sided recess or opening 34, so that the headed end of the screw may be swung outwardly away from the ears 33 to permit the clamping elements to be swung outwardly to the dotted line positions of Fig. 2, and thus disconnect the screws from one of the clamping elements.

To secure the clamping elements after being shifted to the clamping position the screws are again seated in the openings or recesses 34 and may be readily tightened up and the clamping portions 23 of the elements tightly clamped against the opposite sides of the cord or cable, and thus secure to the wiring device and relieve any strain on the binding posts or similar connections of the conductor wires to the electrical contacts in the device by pulling on the cord or cable.

Although both cord clamping elements are mounted for combined outward sliding and swinging movements about the pivot, and this is the preferred construction, one only of the clamps may be mounted by this arrangement if desired, leaving the other element either fixed or having sliding movement only.

Having thus set forth the nature of my invention, I claim:

1. An electrical connector comprising a body member of insulating material having means for mounting lead wire connections and an opening for a lead wire leading to a connection, a cable clamp including a pair of opposed clamping elements each comprising a cable gripping portion and a foot portion, said foot portions extending laterally from the gripping portions in opposite directions, said foot portions being substantially flat and T-shaped with the cross bars at their outer ends spaced outwardly from the cable gripping portions, a protective shell enclosing the body member including an end wall overlying the outer end surface of the body, said foot portions being located between the end walls of the shell and body and said walls forming guide means for said cross bars to permit radial sliding movement of the clamping elements toward and from each other for clamping and releasing the cable, said end walls cooperating with the substantially flat cross bars during the sliding movements to hold the cable gripping portions at substantially right angles to the plane of the end walls, said body being provided with recesses at the outer ends of the guide means to receive the cross bars at the extreme outer position of the clamping elements and permit the gripping portions to be swung outwardly about the cross bars as pivots to a position substantially parallel to the plane of the end walls, and means connecting the gripping portions to clamp them on opposite sides of a conductor cable.

2. An electrical connector comprising a body member of insulating material having means for mounting lead wire connections and an opening for a lead wire leading to a connection, a cable clamp including a pair of opposed clamping elements each comprising a cable gripping portion and a foot portion, said foot portions extending laterally from the gripping portions in opposite directions, securing and guide means securing the foot portions to the body for radial sliding movement to permit lateral movement of the gripping portions toward and from each other to clamp and release a cable between them, said securing means also permitting relative pivotal movement between each foot portion and the body when the clamping elements have been shifted to their outer separated positions to permit the gripping portions to be swung outwardly in opposite directions to positions substantially parallel to the end wall of the body, and means connecting the gripping portions to clamp them on opposite sides of a conductor cable.

3. An electrical connector comprising a body member of insulating material having means for mounting lead wire connections and an opening for a lead wire leading to a connection, a cable clamp including a pair of opposed clamping elements each comprising a cable gripping portion and a foot portion, said foot portions extending laterally from the gripping portions in opposite directions, said foot portions each comprising a central bar and a substantially flat cross bar spaced outwardly from the gripping portion, a protective shell enclosing the body member including an end wall overlying the outer end surface of the body and the outer end portions of the cross bars to secure them to the body and guide them for lateral sliding movement, said end wall also cooperating with the cross bars to hold the cable gripping portions at substantially right angles thereto during the sliding movements, said body being provided with recesses located under the cross bars when they are in their outer positions to permit the cross bars to turn into them and provide pivots for outward swinging movement of the clamping portions away from the right angular positions, and means connecting the gripping portions to clamp them on opposite sides of a conductor cable.

4. An electrical connector comprising a body member of insulating material having means for mounting lead wire connections and an opening for a lead wire leading to a connection, a cable clamp including a pair of opposed clamping elements each comprising a cable gripping portion and a foot portion, said foot portions extending laterally from the gripping portions in opposite directions, means securing said foot portions to the body for lateral sliding movements to permit shifting of the clamping portions toward and from a cable including a metal casing for the body member provided with an end wall having radially extending slots and overlying the body member on opposite sides of said slots forming guideways with said member, the foot portion of at least one of said elements including a substantially flat cross bar spaced outwardly of the clamping portion located at its opposite ends in said guideways and cooperating therewith to hold the clamping elements substantially parallel to the cable during the sliding movements, said body being provided with a recess under the guideways at the outer end of the slot to receive the cross bar when in its outer position and this bar forms a pivotal connection for the clamping element to permit outward swinging movement of the clamping portion of said element, and means connecting the clamping portions of the element to clamp them on a conductor cable.

References Cited in the file of this patent
UNITED STATES PATENTS

| | | |
|---|---|---|
| 1,679,723 | Hubbell | Aug. 7, 1928 |
| 1,890,350 | Webster | Dec. 6, 1932 |
| 2,091,054 | Petrie | Aug. 24, 1937 |
| 2,201,213 | Von Holtz | May 21, 1940 |
| 2,553,681 | Schmier | May 22, 1951 |